United States Patent
Goldberg

[11] Patent Number: 5,983,784
[45] Date of Patent: Nov. 16, 1999

[54] SANDWICH-MAKING APPARATUS

[76] Inventor: Marcia Goldberg, P.O. Box 646, Monsey, N.Y. 10952

[21] Appl. No.: 09/080,803
[22] Filed: May 18, 1998
[51] Int. Cl.⁶ .............................. A47J 37/00; A47J 37/06
[52] U.S. Cl. .................................. 99/382; 99/372; 99/377
[58] Field of Search ............................ 99/339, 340, 349, 99/372–384, 389, 426, 391, 428; 219/521, 494; 425/319, 322; 426/501, 514, 138, 523

[56] References Cited

U.S. PATENT DOCUMENTS

| | | | |
|---|---|---|---|
| 1,606,778 | 11/1926 | Yancey | 99/372 X |
| 1,615,122 | 1/1927 | Gordon | 99/383 X |
| 1,718,260 | 6/1929 | Shaffer | 99/382 X |
| 1,977,084 | 10/1934 | Person | 99/374 X |
| 2,029,448 | 2/1936 | Tatosian | 99/383 X |
| 2,212,003 | 8/1940 | Basham et al. | 99/372 X |
| 2,556,892 | 6/1951 | Young | 99/378 |
| 4,214,517 | 7/1980 | Caldwell | 99/383 X |
| 5,613,426 | 3/1997 | Gabbai | 99/375 |

Primary Examiner—Timothy Simone
Attorney, Agent, or Firm—Stanley J. Yavner

[57] ABSTRACT

A waffle-iron type cooking apparatus is used as an apparatus for cooking and forming one or more sandwiches. Each sandwich has a totally encircling cooked waffle-type substance, with a filling opening, leading to a filling cavity, on one end and with the other end being unopened. In this way, the product of the apparatus is such that a filling can be conveniently added into the cavity, after cooking, to present a novel, and yet convenient, sandwich for eating without the filling leaking from the side edges of the sandwich. Alternatively, the filling can be re-inserted to the apparatus after being placed in the cavity formed thereby, for further cooking by the apparatus, in those cases where it is preferable to heat the filling as well.

5 Claims, 5 Drawing Sheets

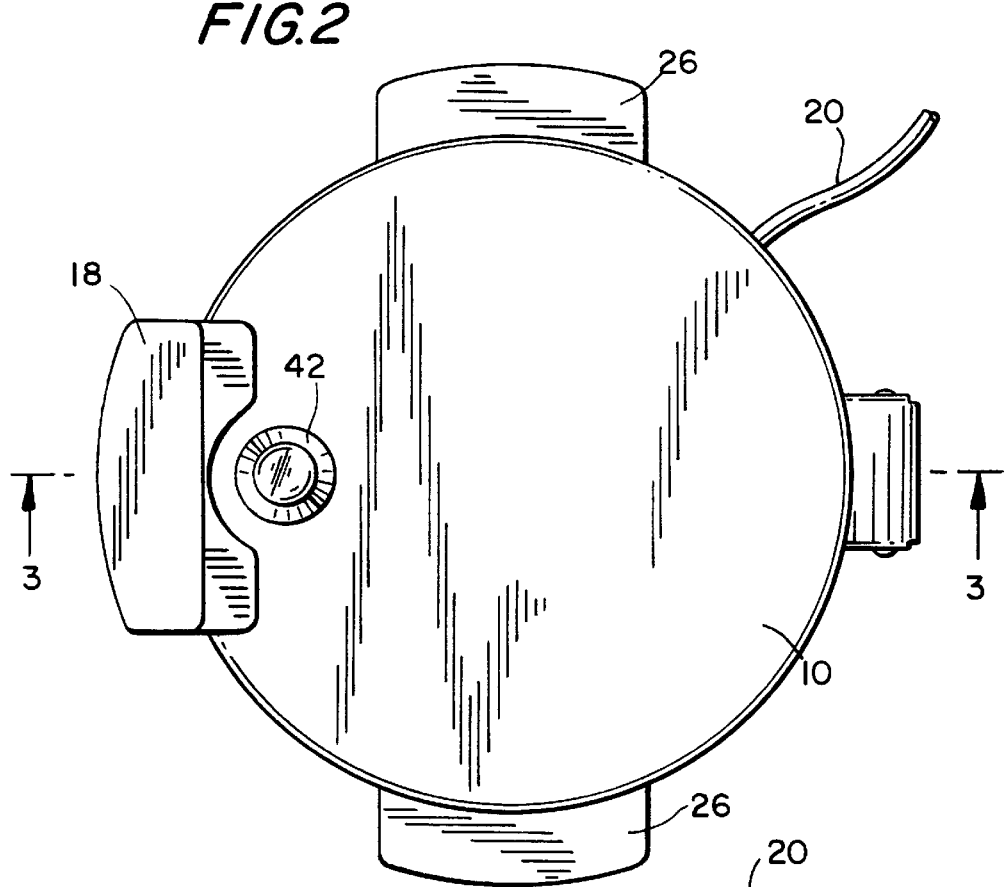
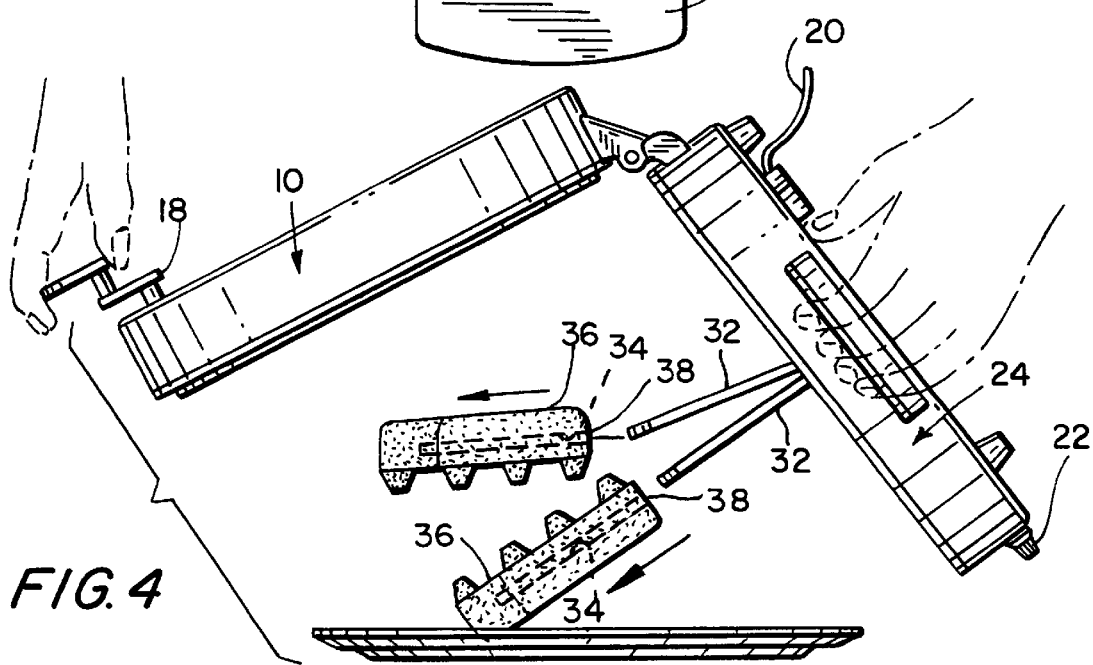

SANDWICH-MAKING APPARATUS

FIELD OF THE INVENTION

This invention relates primarily to an apparatus and a device used in the preparation of food products; and more importantly to an apparatus for facilitating the preparation of a batter-type food product, with a filling.

BACKGROUND OF THE INVENTION

Originally, the traditional sandwich-making process required no apparatus whatsoever. In other words, with two pieces of bread and a filling, sandwiches were formed.

In two respects, the art of sandwich-making grew to require two alterations. The first related to the fact that with certain fillings, the fillings would leak through the side edges as the sandwich was being handled by the eater. The second related simply to the problems created by, generally, the varying styles of sandwiches that became part of modern fast-food and faddish culture, including the various hot sandwiches so popular today.

With respect to the former, an example of the problem presented by the original sandwich relates to the use; for instance, a sandwich filled with egg salad and lots of mayonnaise. Such a sandwich, especially if filled too much would be quite messy for the eater, the filling leaking from the side edges of the sandwich onto hands and clothes. An example of the second type of sandwich is probably best exemplified by sandwiches which use pita bread and a salad filling, wherein the walls of the pita bread are so thin as to lead to the same type of mess as previously described herein. In other words, the walls break, and the filling, whatever it is, leaks through the cracks and openings in the pita bread.

As a backdrop to all of the foregoing, waffle-irons, in traditional form, have been a staple apparatus in food kitchens all around the world. However, a waffle-iron, in its traditional shape, although an excellent apparatus for cooking and shaping waffles, is not particularly useful for making sandwiches, since the waffle pattern of indentations and protrusions provides too thin of a cover for the filling, and also makes cutting into two slabs very difficult.

OBJECTS AND SUMMARY OF THE INVENTION

Accordingly, a primary object of the present invention is to provide a sandwich-making apparatus which produces a sandwich capable of being eaten without an excessive mess for the eater;

A further object of the present invention is to provide, in a waffle-iron type apparatus, variations of structure to produce a convenient sandwich-making device.

These and other objects of the present invention are provided in a waffle-iron type sandwich-making apparatus which features a cover presenting a waffle-type surface, and a bottom surface for enabling the formation of a filling cavity, with a cavity having an opening, for holding, without mess, a filling for a sandwich. The apparatus defines one or more bottom recesses, each with a sandwich cavity and opening forming tongue, above and below which are formed the slabs of the sandwich, and at one end of which is formed the opening to the cavity. More specifically, in the preferred embodiment, a waffle-iron type apparatus is provided, with a base, from the sides of which extend handles or the like, and in which electric heating elements are provided, with suitable controls therefor. A cover unit, also having a handle, is provided with heating elements therein and with waffle-iron type indentations and protrusions defined at the bottom surface thereof. The base further defines upwardly facing recesses, supported by a dividing wall along a center line of the base. Connected to or proximate the wall are hinges for rotatably connecting a tongue, one for each recess, to extend into approximately the center of its recess to thereby define in the sandwich product a cavity and an opening for the cavity to be filled.

As an alternative embodiment, the base defines a single recess and tongue for forming a single sandwich.

A still further alternative provides for, with respect to either embodiment heretofore mentioned, a removable recess insert for the base of the apparatus, which can be used to replace the waffle-type shape normally found in the base of a standard waffle-iron, but of a shape and construction according to the present invention, in either a single or double sandwich apparatus as described herein.

BRIEF DESCRIPTION OF THE DRAWINGS

Other objects, features and advantages of the present invention will become apparent by reference to the following more detailed description of a preferred, but nonetheless illustrative embodiment, and alternative embodiments, with reference to the accompanying drawings wherein:

FIG. 2 is a top view thereof;

FIG. 4 is a side view showing the completion of the sandwich-making process and the apparatus used for that process, according to a preferred embodiment of the present invention;

DETAILED DESCRIPTION OF THE PREFERRED AND ALTERNATIVE EMBODIMENT

Figure 1:
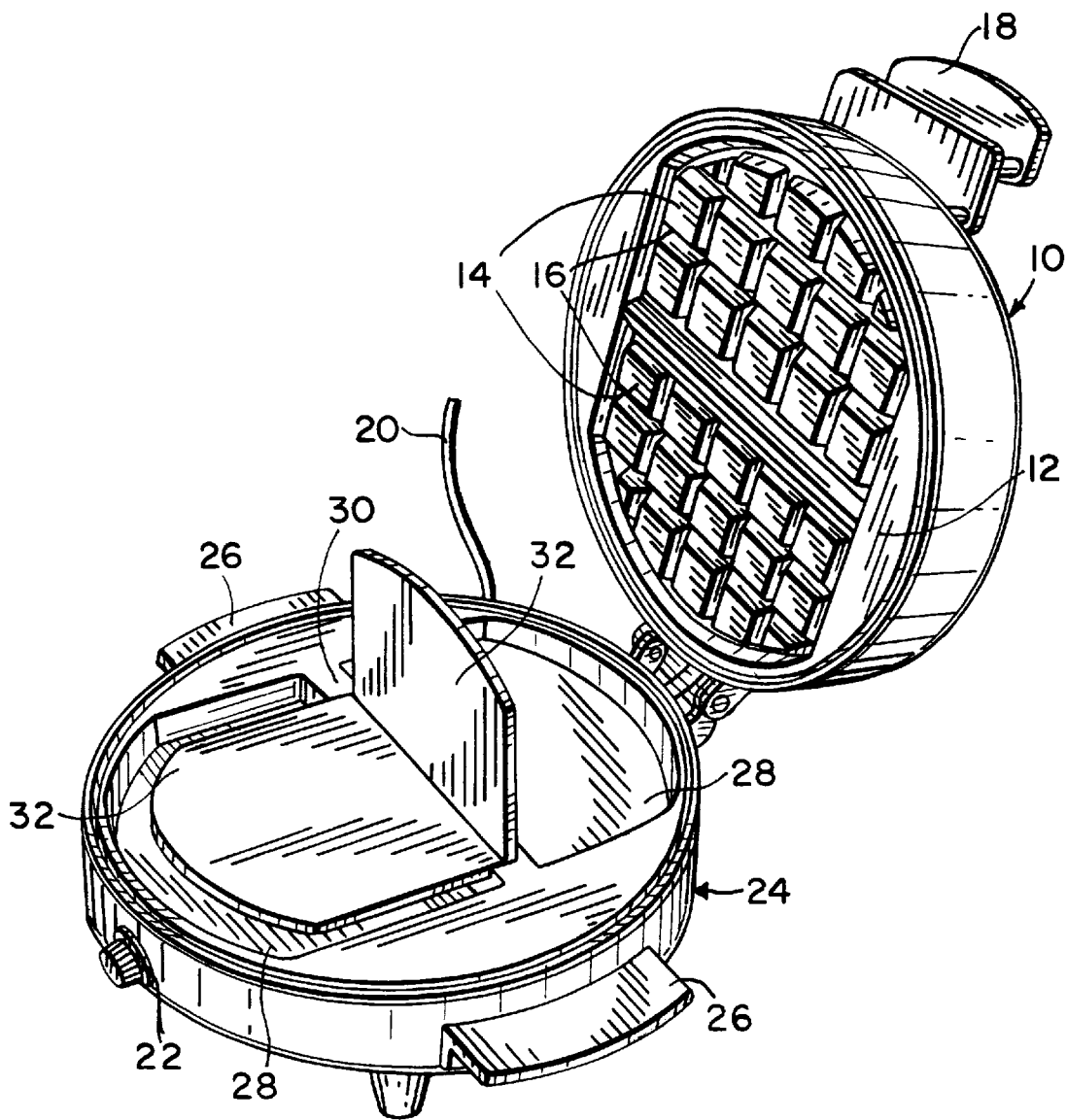
FIG. 1 is a top, front and right side isometric view of the preferred embodiment of the present invention.
Figure 3:
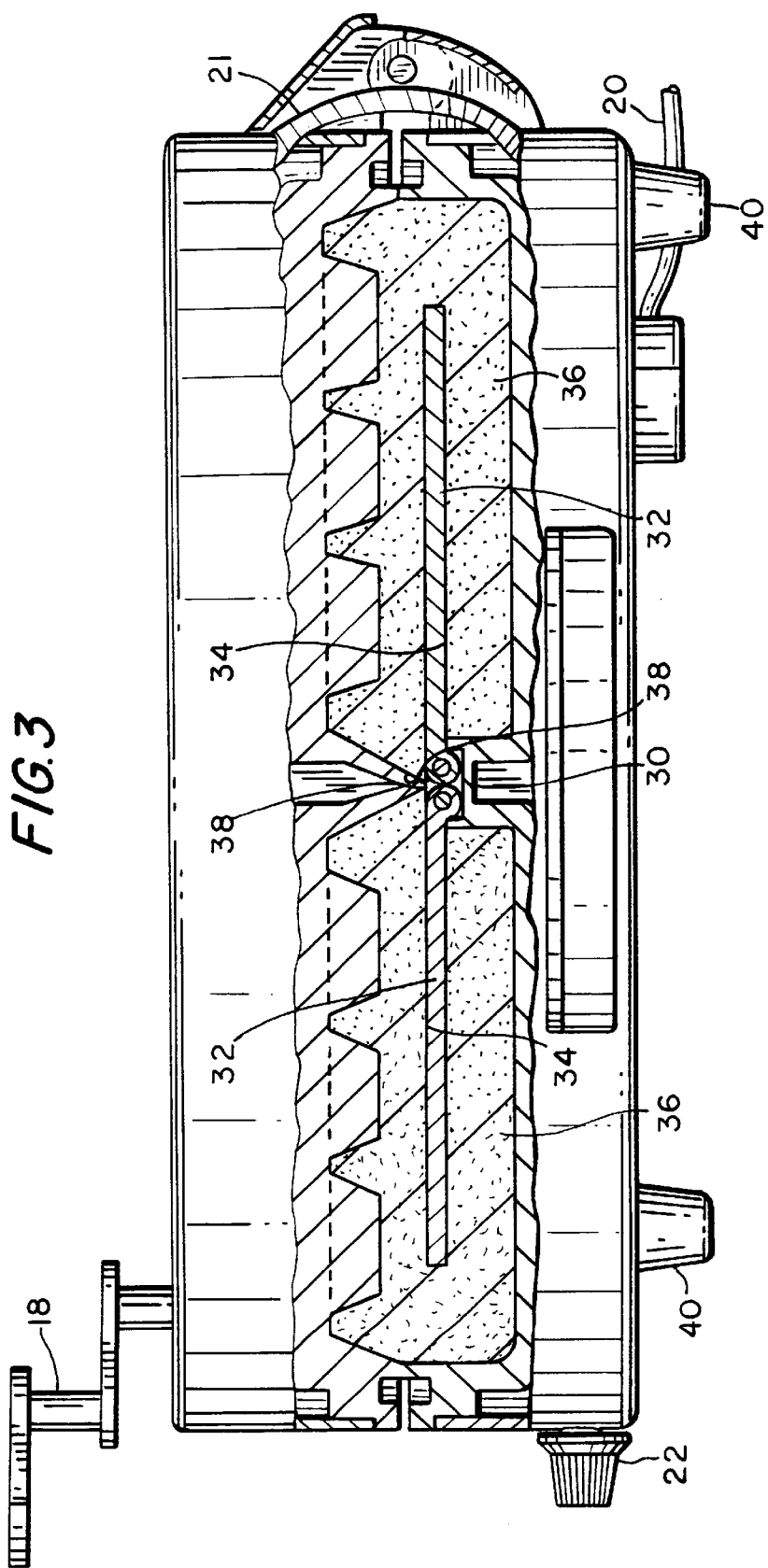
FIG. 3 is a side, sectional view, taken along the line 3—3 of FIG. 2, and showing particularly the formation of sandwiches by use of apparatus according to the present invention.

Referring to FIGS. 1—4, a waffle batter cooking apparatus is shown as including a cover, generally designated 10, with an insert 12. Insert 12 is configured to define a pattern of protrusions 14 and indentations 16, in the manner of the standard waffle-iron cover. For the convenience of usage, a handle 18 is attached to cover 10 and heating elements (not shown) are included within the cover structure. Furthermore, such heating elements are also included in the base structure (not shown) connected to cover heating elements by connection 21 with connections to power 20 and controls 22, as shown particularly in FIGS. 1 and 4.

In terms of departing from the usual waffle-iron type structure, the present invention includes a base structure generally designated 24 with appropriate insulation and handles 26, in the same manner as are provided for cover 10. Within the base structure 24, and at the top thereof, a pair of recesses 28 are provided and defined by the top surface of base structure 24 in order to receive the batter, either waffle-type or similar batter, to be cooked by the apparatus of the present invention. Wall 30 separates the two recesses, and mounts a pair of tongues 32 for satisfying the objectives of the present invention, to make sandwiches with a filled or fillable cavity. More specifically, tongues 32 (FIG. 4 particularly), are rotatably arranged with respect to wall 30 in order to form cavities 34 in the sandwiches, as shown clearly in FIG. 3. FIG. 4 illustrates another function of tongues 32, i.e., to provide an opening 38 in the finished sandwiches 36, so that the cavities 34 are accessible. Such openings 38 are formed by tongues 32 and enable easy removal of such sandwiches 36 from the tongues 32, upon completion of the cooking process. Feet 40 are provided to stabilize base structure 24, and indeed the entire cooking apparatus, during use.

Referring to FIG. 2, the top view of the cooking apparatus is shown, with heat indicator 42 thereon, also to facilitate the use of such apparatus.

Figure 5:
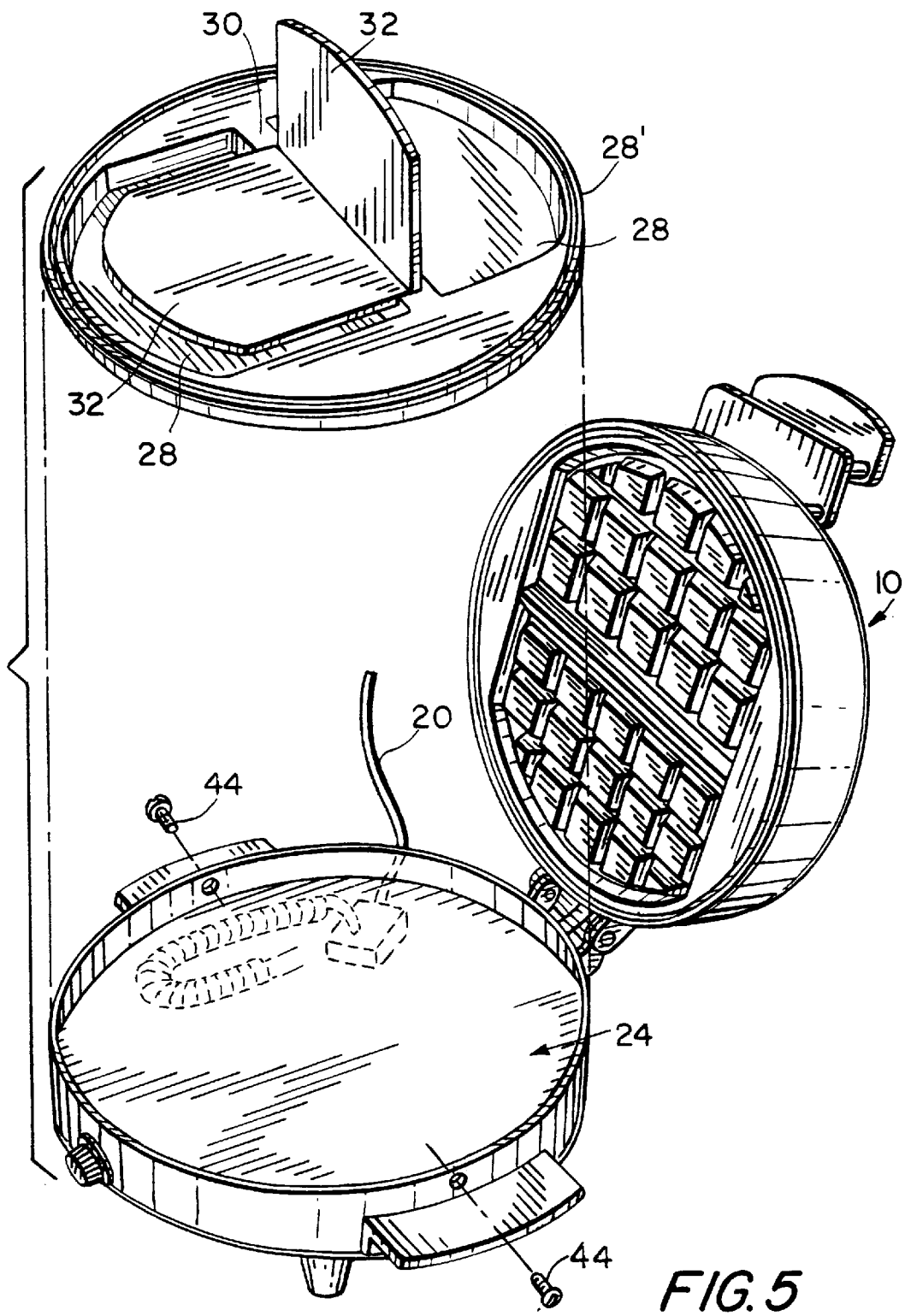
FIG. 5 is an exploded view, similar to that of FIG. 1, but showing the sandwich-forming recesses for the base in a removable structure, according to an alternative embodiment of the present invention.

FIG. 5 shows a variation of the basic structure, whereby a removable recess construction 28' is shown as removable from base structure 24, defining recesses 28, into which tongues 32 are rotatable, and the division of which recesses 28 is accomplished by wall 30. Fasteners 44 are used to fix removable recess construction 28' within base structure 24. Otherwise, the structure is similar to that shown and described with reference to FIGS. 1–4.

Figure 6:
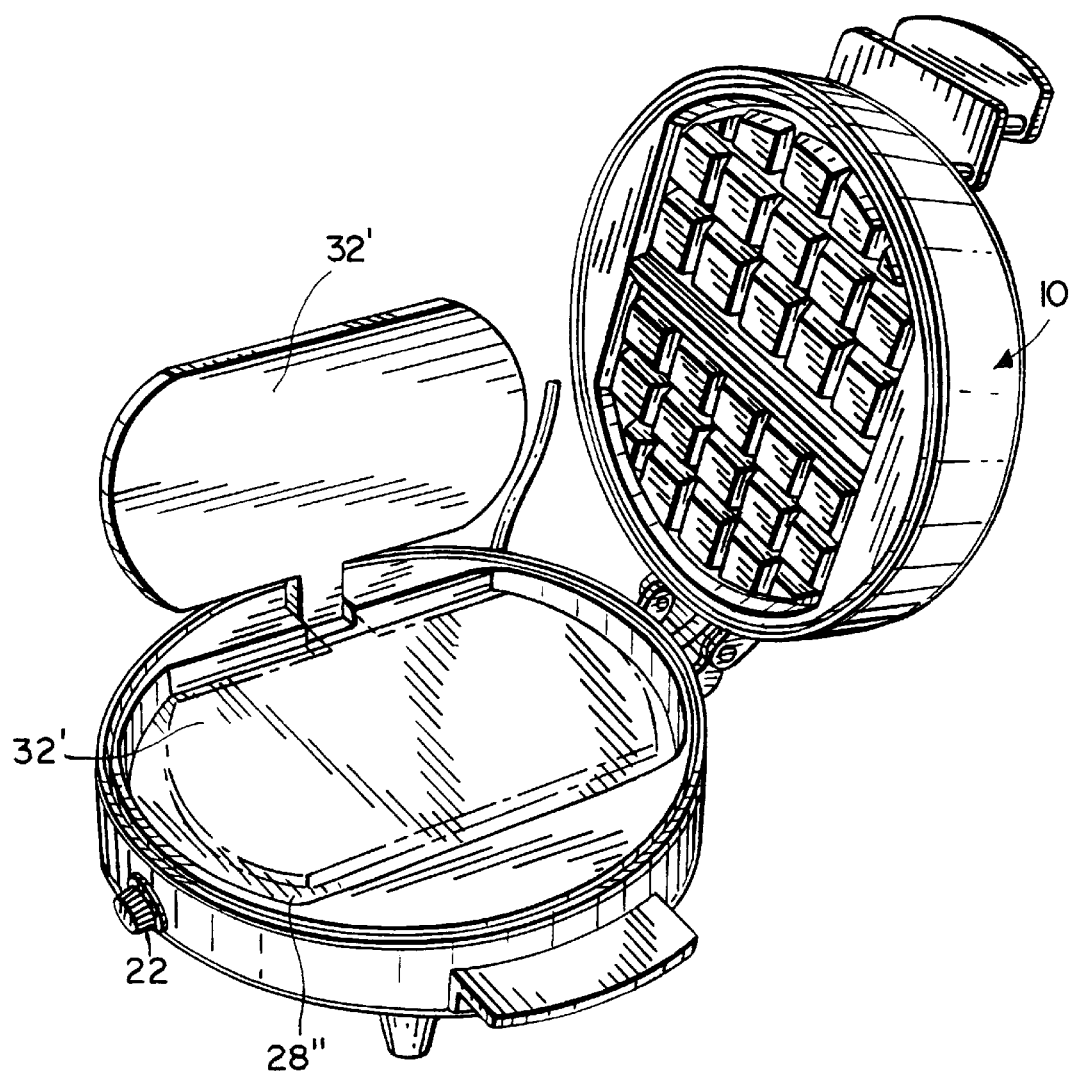
FIG. 6 is a further alternative embodiment of the present invention, but showing a single recess in the base of the sandwich-making structure and apparatus according to the present invention.

FIG. 6 shows a single sandwich maker, with a single recess 28" and a single tongue 32', for use and operation in the same manner as with the previously described embodiments. Of course, the FIG. 6 embodiment is also usable with the removable recess construction concept shown in FIG. 5.

In order to provide a more detailed explanation of the present invention, in terms of both preferred and alternative embodiments, a series of use and operation steps will now be provided. Referring to FIGS. 1 and 6, the entire apparatus is readied for use by pre-heating such apparatus. This is accomplished by turning knob 22 and closing cover 10 until indicator 42 shows the readiness for whatever appropriate batter is to be used for the cooking operation. Such batter is poured into recesses 28 or 28", with tongues 32 and 32' rotated to the horizontal position in the orientation of the drawings. (In FIG. 6, from the position of tongue 32' shown, to the position of tongue 32' shown in ghost lines.) The batter is poured until it substantially covers tongues 32 and 32'. Cover 10 is then closed until cooking takes place to a point indicated as sufficient by indicator 42. At this point, cover 10 is opened and sandwiches removed from recesses 28 and 28" by sliding cavities 34 of sandwiches 36 from tongues 32 through openings 38, as shown in FIG. 4. Sandwiches 36 are then presented with cavities 34 and openings 38, through which a filling is provided to the sandwiches. With the structure and operation of the present invention, sandwiches 36, with fillings therein, are provided with sidewalls surrounding the filling, which are sufficient to prevent leaking of the filling from the side edges of the sandwich, and otherwise to make for a pleasant eating experience. Of course, either after the filling is put into the sandwich, per the above, or if the filling is put in initially in the process, a cooking procedure in the apparatus of the present invention can be used for the filling itself, either with the batter, or with the finished sandwich.

The foregoing structure is provided for explanation and illustrative purposes only, in terms of the present invention. The limits of such invention are not established thereby, but are to be provided only by the following claims:

What is claimed is:

1. A cooking apparatus for use for cooking a batter into a sandwich, with a source of power, heating elements, appropriate insulation and a cover having protrusions and indentations, comprising a base structure defining a recess therein in which said batter is cooked, a rotatable tongue for rotation into said recess for forming a cavity in said sandwich with an opening thereto.

2. The invention according to claim 1 wherein said base structure defines a pair of recesses therein, a rotatable tongue for rotation into each of said pair of recesses, and each of said pair of recesses receiving said batter in order to provide a pair of sandwiches.

3. The invention according to claim 1 wherein said cover includes a handle, said base structure has handle means and heating elements therein, and a heat control knob is provided in said cover for controlling said heating elements.

4. The invention according to claim 1 wherein said base structure is partially removable and replaceable, and includes fasteners for fixing the part of said base structure which is removable, or the replacement structure therefor.

5. The invention according to claim 2 wherein said base structure is partially removable and replaceable, and includes fasteners for fixing the part of said base structure which is removable, or the replacement structure therefor.

* * * * *